(12) United States Patent
Kitoh et al.

(10) Patent No.: US 6,569,557 B1
(45) Date of Patent: *May 27, 2003

(54) LITHIUM SECONDARY BATTERY

(75) Inventors: Kenshin Kitoh, Nagoya (JP); Teruhisa Kurokawa, Aichi-prefecture (JP)

(73) Assignee: NGK Insulators, Ltd., Nagoya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/392,915

(22) Filed: Sep. 9, 1999

(30) Foreign Application Priority Data

Sep. 17, 1998 (JP) .......................................... 10-263500

(51) Int. Cl.⁷ ...................... H01M 10/40; H01M 4/48; H01M 4/62
(52) U.S. Cl. ...................... 429/94; 429/211; 429/224; 429/231.1; 429/231.8
(58) Field of Search ............................ 429/224, 94, 211, 429/231.1, 231.8

(56) References Cited

U.S. PATENT DOCUMENTS

| 5,677,083 A | 10/1997 | Tomiyama |
| 5,869,208 A | * 2/1999 | Miyasaka .................. 429/224 |
| 6,139,986 A | * 10/2000 | Kurokawa et al. ...... 429/211 X |

FOREIGN PATENT DOCUMENTS

| EP | 0 728 701 A1 | 8/1996 |
| EP | 0 762 521 A2 | 3/1997 |
| EP | 0 789 412 A1 | 8/1997 |
| EP | 0 820 113 A1 | 1/1998 |
| JP | 8-69760 | 3/1996 |
| JP | 09-092258 | 4/1997 |
| JP | 09-293538 | 11/1997 |
| JP | 10-064520 | 3/1998 |
| JP | 10-083816 | 3/1998 |
| JP | 10-223207 | 8/1998 |
| JP | 10-321227 | 12/1998 |
| JP | 11-219705 | 8/1999 |

* cited by examiner

Primary Examiner—John S. Maples
(74) Attorney, Agent, or Firm—Burr & Brown

(57) ABSTRACT

A lithium secondary battery includes: an internal electrode body including a positive electrode, a negative electrode, and a separator, the positive electrode and the negative electrode being wound or laminated via the separator, and an organic electrolyte. The active material used in the positive electrode satisfies the following relation between the average particle diameter R ($\mu$m) and the specific surface area S ($m^2/g$):

$$6 \leq R \times S \leq 50$$

The amount of the acetylene black added to the positive electrode active material satisfies the following relation with the specific surface area of the positive electrode active material:

$$S \leq W \leq S+5 \ (W \leq 10)$$

(W is the amount of the acetylene black added to the positive electrode active material, expressed in % by weight based on the amount of the active material, and S is expressed in $m^2/g$.) In this battery, the electron conductivity is improved, and the internal resistance is reduced.

12 Claims, 3 Drawing Sheets

LITHIUM SECONDARY BATTERY

BACKGROUND OF THE INVENTION AND RELATED ART STATEMENT

The present invention relates to a lithium secondary battery wherein the electron conductivity of the positive electrode active material layer is improved, the internal resistance is reduced, and discharging in large output and in large current is possible and which can be suitably used particularly as an electric source for driving of the motor of an electric vehicle or the like.

In recent years, as the movement for environmental protection has become active, it has become a serious issue to control the exhaust gas (e.g. carbon dioxide and other harmful materials) emitted from internal combustion engines or to save energy. In this connection, it has become common, in the automobile industry, to investigate the market introduction, as early as possible, of electric vehicles (EVs) or hybrid electric vehicles (HEVs) in place of conventional automobiles using fossil fuels (e.g. gasoline).

As the battery used for driving of the motor of EV or HEV, a lithium secondary battery is promising for its high energy density. In order for an EV or HEV to exhibit sufficient performance in acceleration, slope-climbing property, continuous running property, etc., the lithium secondary battery used therein must have a large capacity and a large output. For example, in an HEV, the lithium secondary battery for motor driving must have a high output because the motor assists the output of vehicle during acceleration. Since the voltage of a single battery is determined by the materials constituting the battery and, in the case of lithium secondary battery, is at best about 4.2 V in terms of open-circuit voltage and about 3 to 4 V in terms of actual discharge voltage, the above-mentioned "high output" means that a large current flows. In HEVs, etc., a large current of 100 A or more flows often and, in some cases, a current as large as 500 A flows in a short period of time.

To operate the motor of an EV or HEV, it is necessary to connect a plurality of single batteries in series to secure a required voltage. As a result, a current of the same amount flows through the individual batteries. In this case, if each individual battery has a large internal resistance, it is impossible to generate a current of a required amount. Further, if each individual battery has a large internal resistance, a large amount of Joule's heat is generated owing to the internal resistance, and an increase in battery temperature and resultant vaporization of electrolytic solution may take place, which may incur the malfunctioning of batteries. Hence, in order to give rise to discharging of large current and high output such as mentioned above, it is necessary to reduce the internal resistance of each single battery.

With respect to the internal resistance of a single battery, analysis has been made on the resistance to electron conduction or ion conduction, of each material constituting the battery and, as a result, it has been made clear that the resistance to electron conduction, of positive electrode active material occupies a large portion of the internal resistance of a single battery. Hence, it has been attempted to add, to the positive electrode active material, a carbon material (e.g. acetylene black) as a conductivity-improving agent, as one means of reducing the internal resistance of a single battery. It is expected that by increasing the amount of acetylene black added, the electron conductivity of positive electrode active material layer is made higher and the internal resistance of the single battery is reduced.

Addition of acetylene black, however, has problems. Addition of acetylene black contributes to the improvement in electron conductivity but does not contribute to the increase in battery capacity; therefore, the addition reduces the energy density of battery. Further, being bulky, acetylene black is difficult to disperse in production of a slurry of positive electrode active material, and the resulting slurry has low uniformity and low coatability onto substrate.

To alleviate the above low coatability, it is considered to increase the amount of the binder used. This approach, however, invites further reduction in energy density and, moreover, the insulating property of the binder (the binder used has an insulating property in many cases) may reduce the conductivity of the positive electrode active material layer, which has been increased by the addition of acetylene black. Hence, the amount of the acetylene black added is preferably determined so that the amount is kept at the necessary but minimum level, the maximum improvement in electron conductivity is attained, and the internal resistance of battery is reduced, while consideration is taken into the particle shape of positive electrode active material powder.

The present invention has been made in view of the above-mentioned problems of the prior art.

SUMMARY OF THE INVENTION

According to the present invention there is provided a lithium secondary battery, comprising:

An internal electrode body including a positive electrode, a negative electrode, and a separator, the positive electrode and the negative electrode being wound or laminated via the separator, and an organic electrolyte;

wherein the active material used in the positive electrode satisfies the following relation between the average particle diameter R ($\mu$m) and the specific surface area S (m$^2$/g):

$$6 \leq R \times S \leq 50$$

and an amount of the acetylene black added to the positive electrode active material satisfies the following relation with the specific surface area of the positive electrode active material:

$$S \leq W \leq S+5 (W \leq 10)$$

wherein W is the amount of the acetylene black added to the positive electrode active material, expressed in % by weight based on the amount of the active material, and S has the same definition as given above and is expressed in m$^2$/g.

In the lithium secondary battery of the present invention, the positive electrode active material satisfies preferably the following relation between the average particle diameter R and the specific surface area S:

$$6 \leq R \times S \leq 25$$

In the lithium secondary battery of the present invention, the positive electrode active material has an average particle diameter of preferably 1 to 50 $\mu$m, more preferably 5 to 30 $\mu$m; and has a specific surface area of preferably 0.1 to 5 m$^2$/g, more preferably 0.2 to 2 m$^2$/g.

The positive electrode active material is preferably a compound oxide composed mainly of Li and Mn; and the molar ratio Li/Mn of Li and Mn in the positive electrode active material is preferably larger than 0.5. In the positive electrode of the present lithium secondary battery, the active material and the conductivity-improving agent are appropriately combined so as to give a single battery having a battery capacity of 2 Ah or larger. The lithium secondary battery of the present invention can be used suitably particularly in an electric vehicle or a hybrid electric vehicle.

DETAILED DESCRIPTION OF PREFERRED EMBODIMENT

The internal electrode body used in the lithium secondary battery (single battery) of the present invention is produced by winding or laminating a positive electrode and a negative electrode via a separator. The present invention is described below in a case where the internal electrode body is a wound-type.

Figure 1:
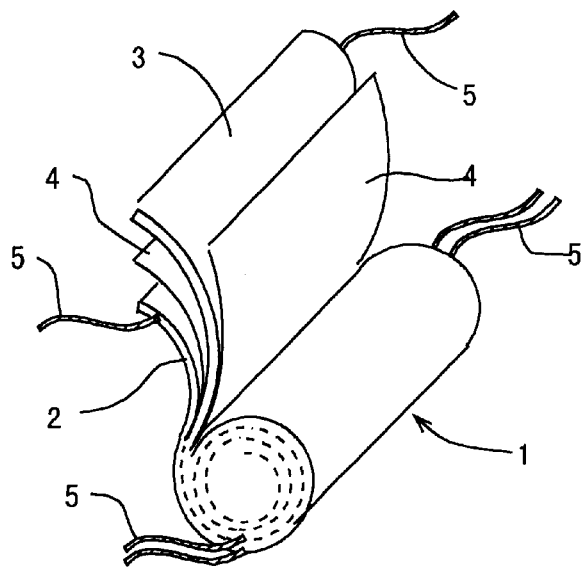
FIG. 1 is a perspective view showing a preferred shape of the internal electrode body used in the lithium secondary battery of the present invention.

As shown in FIG. 1, the wound-type internal electrode body 1 is formed by winding a positive electrode 2 and a negative electrode 3 via a separator 4 made of a porous polymer film so that the two electrodes make no direct contact with each other. To each of the positive electrode 2 and the negative electrode 3 are fitted tabs 5. The fitting of the tabs 5 to the electrode 2 the electrode 3 can be conducted by a means of ultrasonic welding or the like, at the timing of winding the two electrodes together with the separator 4. The other end of each tab 5 (not fitted to the electrode 2 or 3) is fitted to an external terminal (not shown) or a current-extracting terminal (not shown) communicating with an external terminal.

The electrodes 2 and 3 are produced as follows. That is, the positive electrode 2 is produced by using a rectangular metal foil made of aluminum, titanium or the like, as a positive electrode substrate (a collector) and coating both sides of the metal foil with a positive electrode active material to form a positive electrode active material layer; and the negative electrode 3 is produced by using a rectangular metal foil made of copper, nickel or the like, as a negative electrode substrate (a collector) and coating both sides of the metal foil with a negative electrode active material to form a negative electrode active material layer. The tabs 5 are fitted to one side of each rectangular metal foil, and generally have a very thin belt shape so that, in an internal electrode body 1 produced, the parts of the metal foil (electrode 2 or 3) to which the tabs 5 have been fitted, do not bulge toward the circumference of the internal electrode body. Preferably, the tabs 5 are fitted to one side of the rectangular metal foil at nearly equal intervals so that each tab can conduct current collection from a certain area of the electrode 2 or 3. In many cases, the tabs 5 are made of the same material as used for the metal foil to which they are fitted.

As to the kind of the positive electrode active material used in production of the positive electrode 2, there is no particular restriction. There can be used a compound oxide of lithium transition metal, such as lithium cobalt oxide ($LiCoO_2$), lithium nickel oxide ($LiNiO_2$) or the like. In the present invention, a lithium manganese oxide ($LiMn_2O_4$) powder having a spinel structure is used particularly preferably, as shown in the test results described later. The chemical composition $LiMn_2O_4$ is an example and need not be a strictly stoichiometric composition. In the present invention, a chemical composition having a Li/Mn molar ratio of larger than 0.5 is preferred. A chemical composition wherein part of the Mn of $LiMn_2O_4$ has been substituted with other transition metal such as Ti, Cr or the like, may also be used preferably.

As the negative electrode active material, there can be used an amorphous carbon material (e.g. soft carbon or hard carbon) or a carbon powder (e.g. artificial graphite or natural graphite).

The positive and negative electrode active materials are made into respective slurries; each slurry is coated and adhered onto both sides of an electrode substrate; thereby, electrodes 2 and 3 are produced.

As the separator 4, there can be preferably used a separator obtained by interposing a microporous polyethylene (PE) film capable of transmitting lithium ions, between two porous Ipolypropylene (PP) films capable of transmitting lithium ions to form a three-layered structure. In this three-layered structure, when the temperature of the electrode body 1 has increased, the PE film softens at about 130° C., the micropores thereof collapse, and the movement of lithium ions (i.e. the reaction of battery) is suppressed; thus, the three-layered structure acts also as a safety mechanism. By interposing the PE film between the two PP films having a higher softening point than the PE film does, even when the PE film has softened, the PP films retain the shape to prevent the contact and short-circuiting between the positive electrode 2 and the negative electrode 3, whereby the reaction of battery is suppressed reliably and the safety of battery is secured.

As the electrolyte solution, there can be preferably used a non-aqueous organic electrolyte solution obtained by dissolving, in a single or mixed solvent selected from organic solvents such as carbonic acid esters [e.g. ethylene carbonate (EC), diethyl carbonate (DEC) and dimethyl carbonate (DMC)], propylene carbonate (PC), γ-butyrolactone, tetrahydrofuran, acetonitrile and the like, at least one kind of electrolyte selected from lithium fluoride compounds (e.g. $LiPF_6$ and $LIBF_4$) and lithium halides (e.g. $LiClO_4$). The electrolyte solution is filled into the battery case and impregnated into the internal electrode body 1.

As mentioned previously, the positive electrode 2 is produced by making a positive electrode active material into a slurry and coating the slurry on an electrode substrate to form a positive electrode active material layer. In the present invention, in forming the positive electrode active material layer, (1) the positive electrode active material is selected so as to satisfy the following relation between the average particle diameter R ($\mu$m) and the specific surface area S ($m^2/g$):

$$6 \leq R \times S \leq 50$$

and (2) the amount of the acetylene black added to the positive electrode active material is determined so as to satisfy the following relation with the specific surface area of the positive electrode active material:

$$S \leq W \leq S+5 (W \leq 10)$$

wherein W is the amount of the acetylene black added to the positive electrode active material, expressed in % by weight based on the amount of the active material, and S has the same definition as given above and is expressed in $m^2/g$. Acetylene black is one form of the carbon material fine powder used as a conductivity-improving agent, is ordinarily produced by the thermal decomposition of acetylene, and has an average particle (primary particle) diameter of about 10 to 100 nm.

The above two relations are explained below in relation to the production and evaluation of battery.

Table 1 shows the compositions, particle diameters and specific surface areas of the positive electrode active materials used in Examples 1 to 6 and Comparative Examples 1 to 2. In Table 1, Li-rich lithium manganese oxide refers to $Li(Li_xMn_{2-x})O_4$ (X refers to the amount of substitution) obtained by substituting part of the Mn of $LiMn_2O_4$, with Li.

TABLE 1

| | Positive electrode active material | Average particle diameter($\mu$m) | Specific surface area ($m^2/g$) |
|---|---|---|---|
| Example 1 | Li-rich lithium manganese oxide (Li/Mn = 0.55) | 23 | 0.4 |
| Example 2 | Li-rich lithium manganese oxide (Li/Mn = 0.55) | 11 | 0.6 |
| Example 3 | $LiMn_2O_4$ (Li/Mn = 0.50) | 21 | 1.1 |
| Example 4 | $LiMn_2O_4$ (Li/Mn = 0.50) | 6 | 1.7 |
| Example 5 | $LiMn_2O_4$ (Li/Mn = 0.50) | 3.5 | 3.2 |
| Example 6 | $LiCoO_2$ | 35 | 0.3 |
| Comparative Example 1 | $LiCoO_2$ | 7 | 0.7 |
| Comparative Example 2 | $LiMn_2O_4$ (Li/Mn = 0.50) | 38 | 3.8 |

The positive electrode active material used has an average particle diameter of preferably 1 to 50 $\mu$m, more preferably 5 to 30 $\mu$m. The positive electrode active material has a specific surface area of preferably 0.1 to 5 $m^2/g$, more preferably 0.2 to 2 $m^2/g$. When the positive electrode active material has a small average particle diameter or a large specific surface area, a large amount of a binder must be added in production of slurry, or a deflocculant or a dispersant must be added to suppress the cohesion of positive electrode active material and obtain a slurry of good dispersion; as a result, the resulting battery has a low energy density. When the positive electrode active material has a large average particle diameter, precipitation of particles in slurry tends to occur, making difficult the uniform coating of slurry; since the positive electrode active material layer formed has a thickness of about 100 $\mu$m as mentioned later, when there is used a positive electrode active material having an average particle diameter exceeding 50 $\mu$m, the thickness of the positive electrode active material layer is achieved by two particles, resulting in low flatness, low homogeneity and low density of the active material layer.

To each of the positive electrode active materials shown in Table 1 was added 1 to 10% by weight, based on the active material, of acetylene black having an average particle (primary particle) diameter of about 40 nm. Thereto was added, as a binder, a polyvinylidene fluoride (PVDF) in an amount of 8% by weight based on the active material when the amount of acetylene black added was 1 to 6% by weight, and in an amount of 10% by weight when the amount of acetylene black added was 8 to 10% by weight. The resulting mixture was added to n-methylpyrrolidone (NMP) to produce various slurries. Incidentally, in Table 1, the average particle diameter of positive electrode active material is a particle diameter at 50% by volume when measured by the laser diffraction particle size distribution method, and the specific surface area of positive electrode active material is a value obtained by the BET adsorption method using nitrogen.

Each of the slurries obtained above was coated on both sides of an aluminum foil having a thickness of 20 $\mu$m. The resulting material was continuously pressed by the use of a roll press so that the thickness of the resulting positive electrode active material layer became 100 $\mu$m at each side of the aluminum foil, whereby there was obtained a positive electrode having a positive electrode active material layer of improved apparent density and uniform thickness.

Each of the thus-obtained positive electrodes (having a plate shape at this stage) was measured for electron conductivity by pressing the mirror-finish ends of two copper-made cylindrical electrodes of 6 mm in diameter onto the plate-shaped positive electrode at a given pressure with the center-to-center distance of the two cylindrical electrodes being set at 1 cm, applying a given current between the two electrodes, and determining the resistance of the plate-shaped positive electrode from the voltage between the two copper-made cylindrical electrodes. In this case, since the resistance of the aluminum foil constituting the plate-shaped positive electrode is negligibly small as compared with the resistance of the positive electrode active material also constituting the plate-shaped positive electrode, the current flows from one of the cylindrical electrodes to the aluminum foil via the positive electrode active material layer and then flows from the aluminum foil to other cylindrical electrode via the positive electrode active material layer. Thus, the resistance of the positive electrode active material layer can be easily and accurately measured non-destructively.

Figure 2:
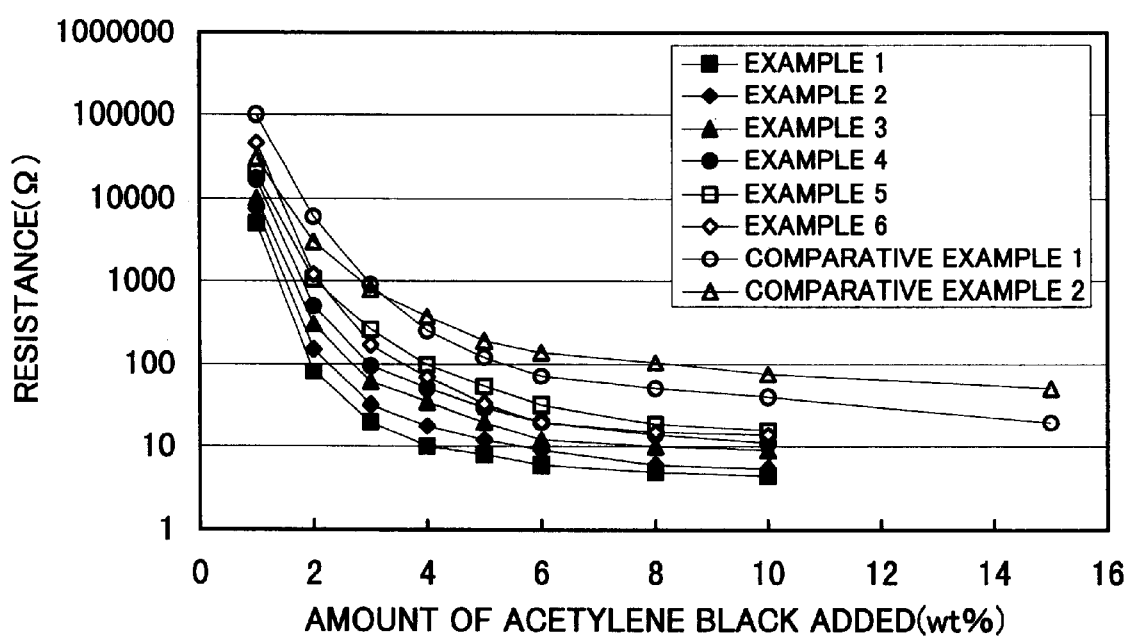
FIG. 2 is a graph showing the resistances of various positive electrode active material layers used in the lithium secondary battery of the present invention.

The relation between the thus-obtained resistance of the positive electrode active material layer and the amount of acetylene black added to the positive electrode active material is shown in FIG. 2. As is clear from FIG. 2, the resistance of positive electrode active material layer is smaller in all of Examples 1 to 6 than in Comparative Examples 1 and 2. In Comparative Examples 1 and 2, the reduction in resistance is small even when acetylene black is added in an amount of 15% by weight. As is clear from the comparison of, for example, Example 2 and Comparative Example 1 showing similar average particle diameters and similar specific surface areas, use of $LiMn_2O_4$ as a positive electrode active material gives a smaller resistance than use of $LiCoO_2$ does; therefore, use of $LiMn_2O_4$ is preferred in production of a battery of small internal resistance. However, as long as required conditions for average particle diameter and specific surface area are satisfied, $LiCoO_2$ can be used preferably as well, as mentioned later. Comparison of Examples 1 to 5 indicates that use of lithium manganese oxide having a Li/Mn molar ratio larger than 0.5 gives a smaller resistance and therefore Li-rich lithium manganese oxide is more suitable for production of a battery of small internal resistance than lithium manganese oxide of stoichiometric Li/Mn molar ratio (0.5).

Figure 3:
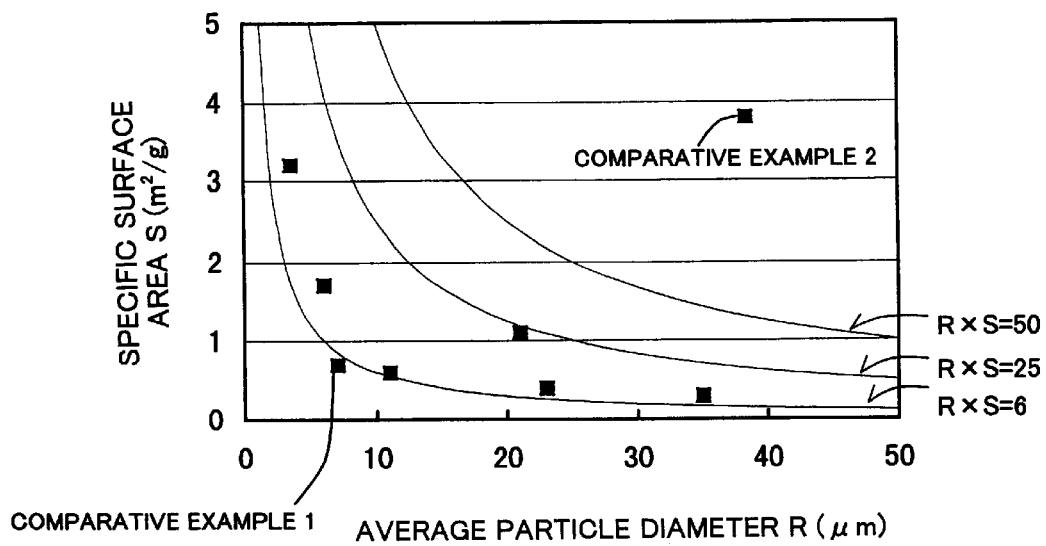
FIG. 3 is a graph showing relations between particle size and specific surface area, in various positive electrode active materials used in the lithium secondary battery of the present invention.

Next, the relation between average particle diameter and specific surface area, of each positive electrode active material used is shown in FIG. 3. In general, an inverse proportion holds between the particle diameters and specific surface areas of various particles when they have the same compositions and are produced by the same process; therefore, the proportional constant thereof can be considered to be a value specific to the material constituting the particles. Hence, by taking into account the results of FIG. 2, it is clear from FIG. 3 that the positive electrode active material used in the present invention preferably satisfies the following relation between the average particle diameter R ($\mu$m) and the specific surface area S (m²/g):

$$6 \leq R \times S \leq 50$$

and more preferably the following relation:

$$6 \leq R \times S \leq 25$$

As is clear from FIG. 2 and FIG. 3, when the average particle diameter and specific surface area of positive electrode active material does not satisfy the above relation, the positive electrode active material layer has a large resistance even if the active material is $LiMn_2O_4$, as seen in Comparative Example 2.

Figure 4:
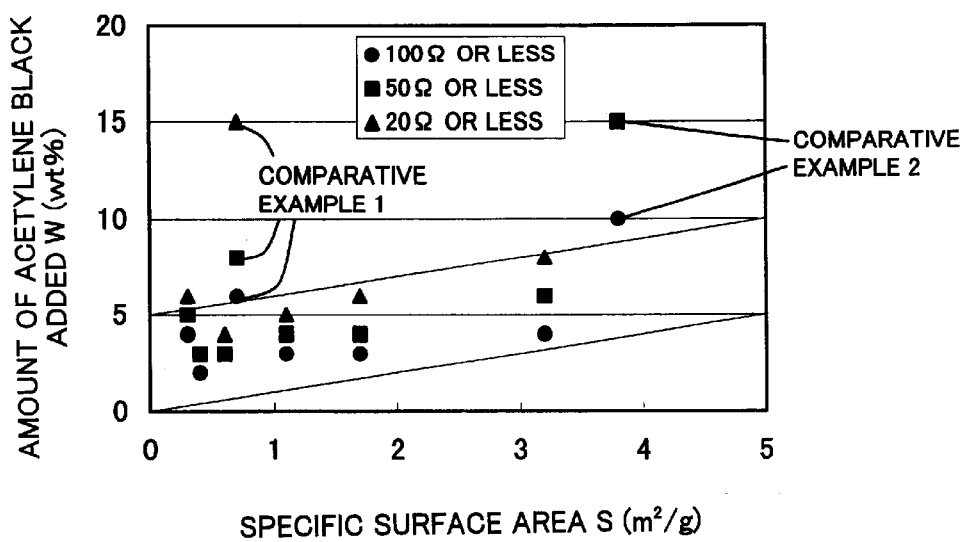
FIG. 4 is a graph showing relations between (a) the specific surface area of the positive electrode active material used in the lithium secondary battery of the present invention and (b) the amount of the acetylene black added to the active material.

FIG. 4 is a graph showing relations between the specific surface area S (m²/g) of positive electrode active material and the amount W (wt. %) of acetylene black added thereto. FIG. 4 shows that the reduction in the resistance of positive electrode active material layer is large when said relation is:

$$S \leq W \leq S+5$$

the reduction is larger when the relation is:

$$S+2 \leq W \leq S+5$$

and the reduction is even larger when the relation is:

$$S+3 \leq W \leq S+5$$

Therefore, when the specific surface area S of positive electrode active material is small, the upper limit of the amount W of acetylene black added is small as well. Here, the specific surface area S of the positive electrode active material is required to also satisfy the above-mentioned relation with the average particle diameter R of positive electrode active material.

Incidentally, the upper limit of the amount W of acetylene black added is 10% by weight. This is because when the amount W of acetylene black added is larger than 10% by weight, the bulk of acetylene black is larger than the bulk of positive electrode active material, a large increase in the amount of PVDF added is necessary, and the resulting battery is significantly low in capacity. In fact, in production of positive electrodes of Examples, etc., the amount of PVDF added was increased as the amount W of acetylene black added was increased.

Next, batteries were produced using each of the positive electrode active materials obtained in Examples 1 and 3 and Comparative Example 1, and were measured for internal resistance. Each positive electrode active material was mixed with 4% by weight of acetylene black and 8% by weight of a PVDF; the resulting mixture was added to NMP to prepare each slurry. The slurry was coated on the both sides of an aluminum foil of 10 $\mu$m in thickness, 3,600 mm in length and 200 mm in width by the use of a roll coater to produce a plate-shaped positive electrode having a coating thickness of 100 $\mu$m at one side.

Meanwhile, plate-shaped negative electrode was produced by adding a required amount of a highly graphitized carbon fiber as a negative electrode active material to a solution of a PVDF dissolved in NMP, to prepare a slurry, coating the slurry on the both sides of a copper foil of 10 $\mu$m in thickness, 4,000 mm in length and 200 mm in width, and adjusting the coating thickness to 80 $\mu$m at one side.

The thus-produced positive electrode and negative electrode both of plate shape were wound via a three-layered microporous separator (thickness: 25 $\mu$m, length: 4,500 mm, width: 220 mm) obtained by interposing a PE film between two same PP films, so that the two electrodes make no direct contact with each other; simultaneously therewith, tabs for current collection were fitted to each electrode by ultrasonic welding; thereby, an electrode body was produced. The internal electrode body was placed in a battery case; the battery case inside was filled with an electrolyte solution obtained by dissolving an electrolyte ($LiPF_6$) in a mixed solvent of EC and DEC; the battery case was sealed; thereby, three kinds of batteries of 50 mm in outer diameter and 240 mm in length were produced.

All of the batteries were charged to a full-charge condition at a 10A constant current and a 4.1V constant voltage. The battery capacity at full-charge condition was 22 Ah (Example 1), 25 Ah (Example 3) and 30 Ah (Comparative Example 1). At this full-charge condition, a current was allowed to flow through each battery at a discharge rate of 0.2C from the open-circuit state, and the internal resistance of the battery was measured by dividing the difference between open-circuit voltage and voltage right after current flowing, with the current. The results of the measurement are shown in Table 2. The battery of Comparative Example 1 had a large capacity but showed a large internal resistance, and is considered to be unsuitable for large-current discharging. Meanwhile, the batteries of Examples 1 and 3 gave small internal resistances of about 3 to 4 m$\Omega$ suitable for high-output and large-current discharging.

TABLE 2

|  | Battery capacity (Ah) | Internal resistance (m$\Omega$) |
|---|---|---|
| Example 1 | 22 | 3.1 |
| Example 3 | 25 | 4.0 |
| Comparative Example 1 | 30 | 13.0 |

As is clear from the above test results, the lithium secondary battery of the present invention using particular materials for the positive electrode is suitable for use as an electric source for driving the motor of an EV or HEV wherein large-current and high-output discharging takes place frequently. Further, the battery of the present invention is suitably used as a single battery of 2 Ah or more in capacity, because in such a battery the charging and discharging properties are greatly influenced by the resistance of the electrode body.

Figure 5:
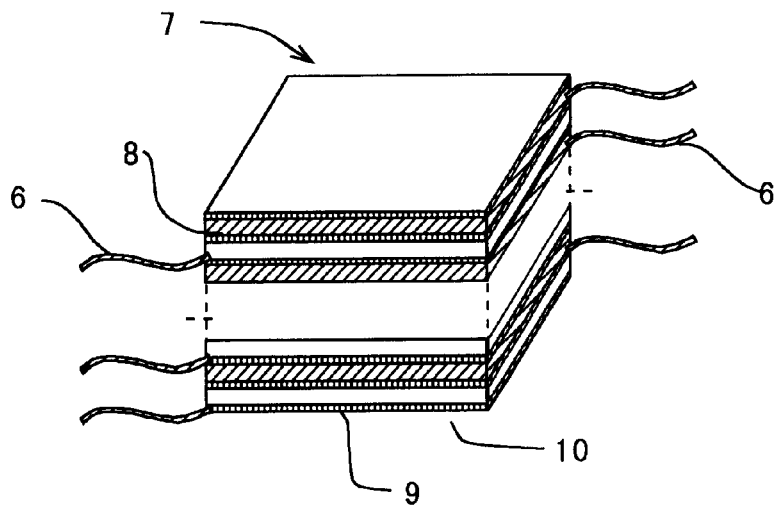
FIG. 5 is a perspective view showing another shape of the internal electrode body which can be used in the lithium secondary battery of the present invention.

In the above, the present invention has been described on a lithium secondary battery using a wound-type electrode body. In the battery of the present invention, the structure of the internal electrode body is not restricted to the wound-type as shown in FIG. 1 because the internal electrode body of the present battery uses positive electrode materials giving a low internal resistance of battery. The internal electrode body of the lithium secondary battery of the present invention may be, for example, a laminate type electrode body 7 shown in FIG. 5, obtained by alternately laminating a positive electrode plate 8 made of materials of the present invention and a negative electrode plate 9 made of negative electrode active materials, via a separator 10 and fitting lead tabs to each of the positive electrode plate 8 and the negative electrode plate 9.

Figure 6:
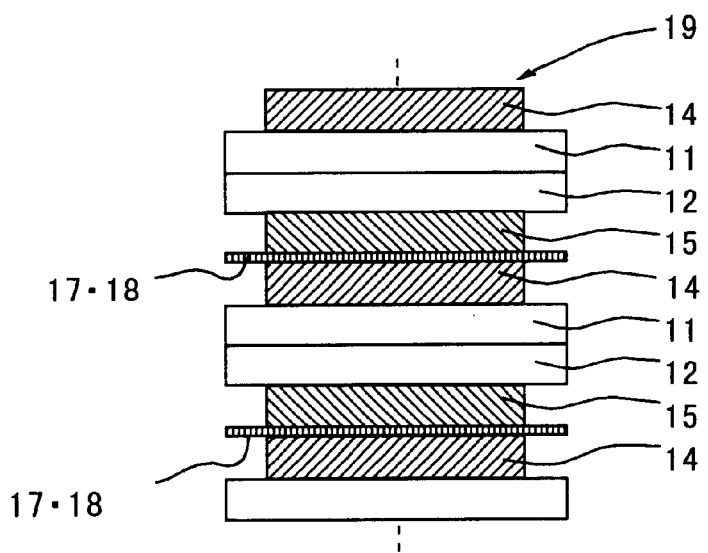
FIG. 6 is a perspective view showing still another shape of the internal electrode body which can be used in the lithium secondary battery of the present invention.

The electrode body of the lithium secondary battery of the present invention may also be an internal electrode body 19 shown in FIG. 6, obtained by forming a positive electrode active material layer 14 on a plate-shaped or foil-shaped positive electrode collector 11, forming a negative electrode active material layer 15 on a negative electrode collector 12, electrically connecting the two collectors 11 and 12 at their sides having no active material layer formed, and piling up the resulting laminate in a plurality of steps so that the positive electrode active material layer 14 and the negative electrode active material layer 15 face with each other via a separator 17 or a solid electrolyte 18. The positive electrode materials of the present invention can be used as well in the positive electrode active material layer 14 of the above internal electrode body 19.

In the lithium secondary battery of the present invention, a positive electrode active material having a small resistance to electron conduction is selected; the amount of the conductivity-improving agent added to the positive electrode active material is optimized depending upon the shape of the positive electrode active material powder; thereby, the resulting positive electrode active material layer has a very low resistance; thereby, large-current high-output discharging can be stably attained without significant reduction in energy density of battery.

What is claimed is:

1. A lithium secondary battery comprising:

an internal electrode body including a positive electrode, a negative electrode, and a separator, the positive electrode and the negative electrode being wound or laminated via the separator, a plurality of current collecting portions welded directly to said positive electrode, a plurality of current collecting portions welded directly to said negative electrode, and an organic electrolyte, the positive electrode comprising a conductive positive electrode collector and a positive electrode coating, the positive electrode coating consisting essentially of positive electrode active material, acetylene black and binder, the negative electrode comprising a conductive negative electrode collector and a negative electrode coating, the negative electrode coating comprising at least one material selected from the group consisting of soft carbon, hard carbon, artificial graphite and natural graphite, wherein the positive electrode active material satisfies the following relation between the average particle diameter R ($\mu$m) and the specific surface area S (m$^2$/g):

$$6 \leq R \times S \leq 50,$$

wherein R is in the range of from 11 to 50 $\mu$m, and the acetylene black is present in the positive electrode coating in an amount which satisfies the following relation with the specific surface area of the positive electrode active material:

$$S \leq W \leq S+5 (W \leq 10)$$

wherein W is the amount of the acetylene black in the positive electrode coating, expressed in % by weight based on the amount of the positive electrode coating, and S has the same definition as given above and is expressed in m$^2$/g, said battery having a capacity of at least 2 Ah and an internal resistance of less than or equal to 4 milli-ohms.

2. A lithium secondary battery according to claim 1, wherein the positive electrode active material satisfies the following relation between the average particle diameter R and the specific surface area S:

$$6 \leq R \times S \leq 25.$$

3. A lithium secondary battery according to claim 1, wherein the average particle diameter of the positive electrode active material is in the range of from 11 to 30 $\mu$m.

4. A lithium secondary battery according to claim 1, wherein the positive electrode active material has a specific surface area of 0.1 to 5 m$^2$/g.

5. A lithium secondary battery according to claim 4, wherein the specific surface area of the positive electrode active material is 0.2 to 2 m$^2$/g.

6. A lithium secondary battery according to claim 1, wherein the positive electrode active material is a compound oxide comprising Li and Mn.

7. A lithium secondary battery according to claim 6, wherein the molar ratio Li/Mn of Li and Mn in the positive electrode active material is larger than 0.5.

8. A lithium secondary battery according to claim 1, which has a capacity of 2 Ah or larger.

9. A lithium secondary battery according to claim 1, which is used in an electric vehicle or a hybrid electric vehicle.

10. A lithium secondary battery according to claim 1, wherein the acetylene black is present in the positive electrode coating in an amount which satisfies the following relation with the specific surface area of the positive electrode active material:

$$S+2 \leq W \leq S+5.$$

11. A lithium secondary battery according to claim 1, wherein the acetylene black is present in the positive electrode coating in an amount which satisfies the following relation with the specific surface area of the positive electrode active material:

$$S+3 \leq W \leq S+5.$$

12. A lithium secondary battery as recited in claim 1, wherein the positive electrode consists of said conductive positive electrode collector and said positive electrode coating.

* * * * *

UNITED STATES PATENT AND TRADEMARK OFFICE
CERTIFICATE OF CORRECTION

PATENT NO. : 6,569,557 B1
DATED : May 27, 2003
INVENTOR(S) : Kenshin Kitoh and Teruhisa Kurokawa It is certified that error appears in the above-identified patent and that said Letters Patent is hereby corrected as shown below:

<u>Column 9,</u>
Line 55, please replace "$6 \leq R \times S 50$" with -- $6 \leq R \times S \leq 50$ --.

Signed and Sealed this

Sixteenth Day of September, 2003

JAMES E. ROGAN
*Director of the United States Patent and Trademark Office*